United States Patent Office 3,816,612
Patented June 11, 1974

3,816,612
PROCESS FOR THE PRODUCTION OF BASICALLY REACTING PHARMACEUTICALS
Wilhelm Schmidt, Buchschlag, and Herward Schindler, Frankfurt am Main, Germany, assignors to Deutsche Gold- und Silber-Scheideanstalt vormals Roessler, Frankfurt am Main, Germany
No Drawing. Continuation of abandoned application Ser. No. 625,322, Mar. 23, 1967. This application Feb. 10, 1970, Ser. No. 9,120
Int. Cl. A61k 9/00
U.S. Cl. 424—45
20 Claims

ABSTRACT OF THE DISCLOSURE

A method of forming stable solutions of at least one pharmaceutical substance containing a basically reacting nitrogen atom in pharmaceutically acceptable organic solvent systems, the step of incorporating a solution aid selected from the group consisting of aryl sulfonic acid, lower alkyl substituted aryl sulfonic acids, hydroaromatic sulfonic acids, lower alkyl substituted hydroaromatic sulfonic acid, terpene sulfonic acids, camphor sulfonic acids and sulfuric acid semiamides of the formula

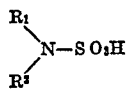

wherein $R^1$ and $R^2$ taken individually are hydrogen, lower alkyl, phenyl and phenyl alkyl having 1–5 C atoms in the alkylene group and $R^1$ and $R^2$ taken together is a divalent radical forming a 5 to 7 membered heterocyclic ring with the nitrogen atom shown selected from the group consisting of alkylene, aza-alkylene and oxa-alkylene to improve the solubility of the pharmaceutical substance in said solvent system.

---

This application is a continuation of application Ser. No. 625,322, filed Mar. 23, 1967, now abandoned.

BACKGROUND OF THE INVENTION

The present invention relates to a process for producing improved solutions of basically reacting pharmaceuticals in pharmaceutically acceptable organic solvents.

The application of pharmaceuticals in the form of injections and aerosols is of considerable significance. Especially, the use of pharmaceuticals in the form of aerosols, for example, for inhalation or local applications finds increasing application. These forms of use require dissolution of the pharmaceutical. Consequently, good solubility or respectively good solubility promoting agents are a prerequisite for optimal medical application.

However, the solubility properties of many pharmaceuticals are not sufficient. Often, for example, the solubility of basic reacting pharmaceuticals in the usual form of their hydrochlorides only suffices for the preparation of pharmaceutically acceptable solutions in water or alcohol. In a number of pharmaceuticals, such as, for example, 1-3-methoxy-ω-(1-hydroxy - 1 - phenyl-isopropyl-amino)-propiophenone, N - (3-[4-(2-hydroxy-ethyl)-piperazino]-propyl)-2-chloro-thiophenyl pyridyl amine, neomycin, aureomycin, papaverine or dl-7-{3-[2-(3,4-dihydroxy phenyl) - 2 - hydroxy-ethyl-amino]propyl}-theophylline even the solubility in alcohol is much too low. Furthermore, in many basically reacting pharmaceuticals or their salts the solubilities are entirely insufficient if other organic solvents or organic materials are added to their aqueous or alcoholic solutions as such additions cause precipitation of the pharmaceuticals. For instance, the hydrochlorides of pharmaceuticals will precipitate in crystalline form either immediately after or a few minutes after ethanol solutions thereof are mixed with the propellant normally employed for aerosols, such as, for example, may consist of monofluorotrichloromethane and difluorodichloromethane or difluorodichloromethane and tetrafluorodichloroethane.

Investigation of the solubilities of other salts, such as, for example, the sulfates, phosphates, acetates, propionates, stearates, palmitates, glycolates, tartrates, citrates, lactates, adipates, maleates, fumarates, ascorbates, benzoates and gentisinates showed no improvements over the hydrochlorides.

SUMMARY OF THE INVENTION

According to the invention it was unexpectedly found that generally the solubility of pharmaceuticals containing one or more basically reacting nitrogen atoms in pharmaceutically acceptable solvents or solvent mixtures can be increased very considerably if aryl sulfonic acids, if desired, substituted with lower alkyl groups, hydroaromatic sulfonic acids, if desired, substituted with lower alkyl groups, terpene sulfonic acids, camphor sulfonic acids, guaiazulene sulfonic acid or sulfuric acid semiamides of the formula

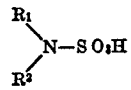

wherein $R^1$ and $R^2$ taken individually are hydrogen, phenyl or phenalkyl groups with 1–5 carbon atoms in the alkylene group and lower alkyl group and when taken together are alkylene, oxa-alkylene or aza-alkylene groups forming a 5 to 7 membered ring with the nitrogen atom as in pyrrolidine, piperidine, piperazine, homopiperazine and morpholine rings, are employed as solution aids.

Especially suited examples of such sulfonic acids or sulfuric acid semiamides used as solvent aids according to the invention are benzene sulfonic acids, benzene sulfonic acids substituted with lower alkyl groups, camphor sulfonic acids, guaiazulene sulfonic acid, sulfuric acid monocycloamides and similar compounds. The solution aids can be used singly or in combination.

DETAILED DESCRIPTION OF THE INVENTION INCLUDING PREFERRED EMBODIMENTS

The activity of the sulfonic acids and sulfuric acid semiamides according to the invention in improving the solubility is effective for all pharmaceuticals which contain one or more basically reacting nitrogen atoms. The chemical structure of the pharmaceutical is of little significance and can belong to the most various classes of chemical substances. For example, it may belong to the class of β-aminoalcohols and their derivatives, especially, β-aminoethanols and β-aminopropanols which, if desired, may be substituted by low molecular weight alkyl or aralkyl groups on the amino group and by a phenyl, hydroxy phenyl or dihydroxy phenyl group in α position; or belong to the class of amino alkyl phenols with alkylene radicals of 2–4 C atoms; or belong to the class of diphenyl alkyl amines with alkylene radicals of 2–6 C atoms, in which the amino group is substituted with low molecular weight alkyl or aralkyl groups; or belong to the group of basically substituted esters and amides of p-amino benzoic acid in which the hydrogen atoms of the amino group may be substituted by amino alkyl groups and the hydrogen atoms of the amido nitrogen may be substituted by amino alkyl groups and whereby the alcohol component of the esters is, for example, derived from low molecular weight aliphatic alcohols or aliphatic amino alcohols with 1 to 5 carbon atoms, preferably, from the lower alkanols or lower amino alkanols; or belong to the class of alkaloids, of tetracyclines of neomycins; or belong to the class of basically reacting heterocyclic compounds containing 1 to 3 heteroatoms, such as, oxygen, nitrogen or sulfur, which, for example, have a monocyclic or condensed bi- or tricyclic ring system with the individual rings being of 5 or 6 members and in which the basic center is contained either in the heterocycle or in substituents, such ring systems, if desired, carrying halogen atoms, hydroxy, alkyl, amino or amino alkyl groups as substituents; or belong to the group of basically substituted xanthine derivatives, especially, theophylline or theobromine derivatives of the formula

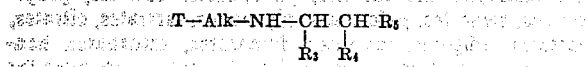

$$T-Alk-NH-CH\ CH\ R_5$$
$$\qquad\qquad\quad\ |\quad\ |$$
$$\qquad\qquad\quad R_3\ \ R_4$$

wherein T signifies a dialkyl xanthine radical, Alk signifies an alkylene group (straight or branched) of 2–4 C atoms, $R_3$ signifies hydrogen or a lower alkyl group, $R_4$ signifies hydrogen or a hydroxy group and $R_5$ signifies phenyl or a hydroxy phenyl group.

The sulfonic acids and sulfuric acid semiamides employed according to the invention form acid addition salts with the basically acting pharmaceutical compounds.

Table 1 below illustrates the improved solubilities obtained in various solvents according to the invention using neomycin as an example. All values as to solubilities have been calculated as neomycin base.

The neomycin salts employed according to the invention, for instance, in addition to having good solubility in hydroxyl group containing organic solvents also generally have good solubility in water. Furthermore, it was found that solutions of pharmaceuticals produced according to the invention with, for instance, alcohols can be diluted considerably with other organic solvents before precipitation occurs.

This is illustrated in Table 2 given below which indicates the quantity of other solvent in ml. which can be added to a solution of the neomycin salt according to the invention indicated (corresponding to 330 mg. neomycin base) in 15 ml. of ethanol without causing precipitation.

TABLE 2

| Solvent | Neomycin p-toluene sulfonate | Neomycin camphor sulfonate | Neomycin benzene sulfonate | Neomycin guaiazulene sulfonate |
|---|---|---|---|---|
| Carbon tetrachloride | 35 | 60 | 10 | 300 |
| Acetone | 55 | 100 | 30 | >3,000 |
| Chloroform | 90 | 500 | 60 | >3,000 |
| Benzene | 30 | 80 | 30 | 300 |

The improved solubilities of salts of various other basically reactive pharmaceutical compounds according to the invention as compared to the solubility of the normal salts such as the hydrochloride is illustrated in Table 3 given

TABLE 1
Dissolved quantity neomycin salt, calculated as neomycin-base (mg./500 ml.)

| | Neomycin sulfate | Neomycin hydrochloride | Neomycin p-toluene sulfonate | Neomycin camphor sulfonate | Neomycin benzene sulfonate | Neomycin guaiazulene sulfonate |
|---|---|---|---|---|---|---|
| Methanol | 15.8 | 420 | 2,200 | 2,200 | 6,600 | 3,000 |
| Ethanol | 6.7 | 48 | 2,200 | 2,200 | 6,600 | 3,000 |
| n-Propanol | <10 | <15 | 825 | 220 | 6,600 | 3,000 |
| n-Butanol | <10 | <15 | 730 | 330 | 6,600 | 3,000 |
| Ethylene glycol | 3.16 | 285 | 1,650 | 1,650 | 6,600 | 3,000 |
| Glycerine | 1,400 | 1,850 | 3,300 | 3,300 | 6,600 | 750 |
| Benzyl alcohol | 865 | 74 | 2,200 | 2,200 | 6,600 | 3,000 |
| Polyethylene glycol 400 | 0 | 15 | 1,650 | 825 | 6,600 | 3,000 |
| Tween 40 | ca. 15 | 0 | 1,100 | 1,100 | 1,100 | 3,000 |
| Span 20 | ca. 10 | 0 | 1,100 | 1,100 | 1,100 | 3,000 |
| Phenol | ca. 10 | ca. 10 | 6,600 | 6,600 | 6,600 | 3,000 | below. The values given are the quantity of pharmaceutical calculated as free base in mg. which dissolve in 6 ml. of ethanol (96%).

TABLE 3

| Basically reactive pharmaceutical | Solution aid, mg. | | | | |
|---|---|---|---|---|---|
| | Hydrochloride | Benzene sulfonate | p-Toluene sulfonate | d,l-Camphor sulfonate | Cyclohexy amido-sulfuric acid |
| 2-methylamino-1-phenyl-propane-1-ol | <300 | | | 600 | |
| 1-3-methoxy-ω-(1-hydroxy-1-phenylisopropyl-amino)-propiophenone | <30 | 850 | 300 | 900 | |
| 1-[N-[3-phenyl-3-hydroxypropyl-(2)]-aminoethyl]-naphthyl-ketone | <40 | | | 900 | 900 |
| 2-(p-hydroxyphenyl)-ethylamine | <200 | | | 600 | |
| N-(3,3-diphenylpropyl)-α-methylphenethylamine | <270 | | | 600 | |
| p-Aminobenzoic acid-β-diethylamino-ethylester | <150 | | 500 | 540 | |
| Papaverine | <30 | | | 600 | |
| Aureomycin | 10 | 200 | | 90 | |
| d,l-N-methylhexahydropicolinic-acid-2,6-dimethylanilide | <600 | 1,500 | 1,500 | 400 | 200 |
| 2-(morpholinoethylmercapto)-6-chloropyridine | <600 | | | >800 | >600 |
| 2-(morpholinoethylsulfoxyl)-6-chloropyridine | 95 | | | 600 | |
| N-dimethylamino-isopropyl-thiophenyl-pyridylamine [1] | 400 | 700 | | | 600 |
| N-(3-Dimethylamino-propyl)-thiophenyl-pyridylamine [1] | <20 | | | 600 | |
| N-[3-[4-(2-Hydroxy-ethyl)-piperazino]-propyl]-2-Cl-thiophenyl-pyridylamine [1] | 10 | 600 | | 600 | |
| d,l-7-[3-[2-(3,4-dihydroxy-phenyl)-2-hydroxyethylamino]-propyl]-theophylline | <5.4 | | 30.4 | 274.2 | |
| 7-[2-[2-Hydroxy-2-(3,4-dihydroxyphenyl)-ethylamino]-ethyl]-theophylline | 68.4 | | 273.2 | 273.2 | |
| 7-[2-[1-Methyl-2-phenyl-ethylamino]-ethyl]-theophylline | 135.6 | | 271.2 | 271.2 | |

[1] Thiophenyl pyridylamine =

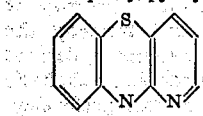

An especial advantage of the invention is that it is especially useful in the production of aerosol preparations. Whereas previously basically reacting pharmaceuticals often could only be used as suspension aerosols, the present invention renders it possible to produce such aerosols as clear solutions. Solutions have the advantage over suspensions in the homogeneous distribution of the pharmaceutical and its uniform application. Furthermore, they have the further advantage that sedimentation or creaming of the solids is avoided and that clogging of the valves and uncertain dosing are precluded.

The solutions produced according to the invention also can contain several basically acting pharmaceuticals. In addition, other active pharmaceuticals or adjuvants, such as, non-basic pharmaceuticals, stabilizing adjuvants, such as ascorbic acid and its esters, and the like, taste correcting substances, such as sweetners, aromatic oils, essences and the like, substances which form films on the skin or mucous membrane, such as polyvinyl pyrrolidone, cellulose derivatives and the like, local anaesthetics or antihistamines can be incorporated therein.

The following examples will serve to illustrate the invention with reference to several embodiments thereof.

EXAMPLE 1

830 mg. of neomycin d-camphor-β-sulfonate, composed of 330 mg. of neomycin base and 500 mg. of d-camphor-β-sulfonic acid, were dissolved in 25 ml. of benzyl alcohol with light warming and then 25 ml. of ethanol and 5 ml. of isopropyl-myristate were added thereto. Subsequently the solution was mixed with 45 ml. of peanut oil. A clear stable solution resulted.

EXAMPLE 2

415 g. of neomycin benzene sulfonate composed of 165 mg. of neomycin base and 250 mg. of benzene sulfonic acid were dissolved in 10 g. of polyethylene glycol 400 and then homogeneously mixed with 30 g. pentaerythritol-monolaurate-polyglycol ether and 9.5 g. of pentaerythritol-monostearate. A hydrophilic salve is obtained which contains the antibiotic as a true solution.

EXAMPLE 3

100 mg. of neomycin-guaiazulene sulfonate were dissolved in 1.1 ml. of polyethylene glycol 400. This solution was added to a mixture of 7.2 ml. of pentaerythritol-mono-laurate-polyglycol ether and 1.6 ml. of pentaerythritol-monostearate liquified by slight warming while stirring. After cooling a hydrophilic salve is obtained which contains the antibiotic as a true solution. This salve is especially interesting in that in addition to the neomycin the guaiazulene component is also pharmaceutically active.

EXAMPLE 4

106 mg. of neomycin-p-toluene sulfonate composed of 42 mg. of neomycin base and 64 mg. of p-toluene sulfonic acid were dissolved in a mixture of 30.8 g. of ethanol, 0.9 g. of 1,2-propylene glycol and 0.9 g. of fatty alcohol polyglycol ether with slight warming. After cooling 6.3 g. of a copolymer of vinyl pyrrolidone and vinyl acetate were added to the solution. The solution was then filled into an aerosol pressure container provided with a spray valve together with 21 g. of difluorodichloromethane as propellant. A clear stable solution resulted which could be sprayed without problems.

EXAMPLE 5

106 mg. of neomycin-p-toluene-sulfonate and 194 mg. of N-di-methyl-amino-isopropyl-thiophenyl pyridylamine-benzene sulfonate were dissolved in 37 g. of ethanol. After mixing in 1.7 g. of 1,2-propylene glycol, the solution was filled into an aerosol pressure container provided with a spray valve together with 21 g. of difluorodichloromethane as propellant. A clear stable solution resulted which could be sprayed without problems.

EXAMPLE 6

96 g. of neomycin-p-toluene sulfonate composed of 38 mg. of neomycin base and 58 mg. of p-toluene solfonic acid, were dissolved together with 190 mg. of N-dimethyl-amino - isopropyl - thiophenyl - pyridylamine-p-toluene-sulfonate in 35 g. of ethanol with slight warming. After cooling, 14 mg. of neomycin-guaiazulene sulfonate and 3.7 g. of a copolymer of vinyl pyrrolidone and vinyl acetate were added to such solution and the solution then filled into an aerosol pressure container provided with a spray valve together with 21 g. of difluorodichloromethane as propellant. A clear stable solution resulted which could be sprayed without problems.

EXAMPLE 7

600 mg. of 2-methylamino-1-phenyl-propanol-(1) and 906 mg. d,l-camphor sulfonic acid were dissolved in 96% ethanol with light heating to a total volume of 6 ml. After cooling, the solution was filled together with 10 g. of a mixture of difluorodichloromethane and tetrafluorodichloroethane 4060 into an aeorsol pressure container provided with a spray valve. A clear solution was obtained which could be sprayed without problems.

EXAMPLES 8–35

The substances indicated in Table 4 were dissolved, if necessary, under slight warming and stirring, and then converted by addition of fluorohydrocarbons to clear sprayable solutions as described in Example 7. The volume of the alcoholic active substance solution in Example 10=6.5 ml., in Example 26=8.5 ml. and in the remaining Examples=6 ml.

In the examples calculated on the amount of fluorochlorohydrocarbon aerosol, the amount of base ranges from a low of 0.2% (Example 4) to a high of 12% (Example 25).

TABLE 4

| Example No. | Basic pharmaceutical | Mg. | Solution aid | Mg. | Further addition | Mg. | Propellant | G |
|---|---|---|---|---|---|---|---|---|
| 8 | 1-3-methoxy-ω-(1-hydroxy-1-phenyl-isopropyl-amino)-propiophenone. | 750 | Cyclohexylamidosulfuric acid. | 432 | Saccharin / Banana essence synthetic. | 10 / 15 | Difluorodichloromethane plus tetrafluorodichloroethane 4060. | 10 |
| 9 | do | 900 | d,l-Camphor sulfonic acid. | 720 | | | do | 10 |
| 10 | do | 450 | Benzene sulfonic acid | 235 | Saccharin / 1,2-propanediol / Caramel essence synthetic. | 10 / 450 / 15 | do | 9.5 |
| 11 | do | 450 | Sulfuric acid mono-(N-cyclohexylamide). / Benzene sulfonic acid | 130 / 115 | Ol.Anisi / Ol.Caryophylli | 50 / 50 | do | 10 |
| 12 | 1-{N-[3-phenyl-3-hydroxypropyl-(2)]-amino ethyl}-naphthyl-ketone. | 600 | d,l-Camphor sulfonic acid. | 450 | | | Monofluorotrichloromethane plus difluorodichloromethane 5050. | 10 |
| 13 | 2-(p-hydroxyphenyl)-ethylamine. | 600 | do | 1,080 | | | do | 10 |
| 14 | N-(3,3-diphenylpropyl)-α-methyl-phenethyl-amine. | 540 | do | 410 | | | do | 10 |
| 15 | p-Aminobenzoic acid-β-diethylaminoethylester. | 300 | d,l-Camphor sulfonic acid | 318 | | | Difluorodichloromethane plus tetrafluorodichloroethane 4060. | 10 |

TABLE 4—Continued

| Example No. | Basic pharmaceutical | Mg. | Solution aid | Mg. | Further addition | Mg. | Propellant | G |
|---|---|---|---|---|---|---|---|---|
| 16 | Papaverine base | 90 | d,1 Camphor sulfonic acid | 66 | | | Difluorodichloromethane plus tetrafluorodichloroethane 4060 | 10 |
| 17 | d,1-N-methylhexahydro-picolinic acid-2,6-dimethyl-anilide | 600 | p-Toluene sulfonic acid | 462 | | | do | 10 |
| 18 | 2-(morpholinoethylmercapto)-6-chloropyridine | 600 | Sulfuric acid mono-(N-cyclohexylamide) | 414 | Ascorbylpalmitate | 30 | do | 10 |
| 19 | 2-(morpholinoethylsulfoxyl)-6-chloropyridine | 600 | d,1-Camphor sulfonic acid | 546 | | | do | 10 |
| 20 | N-dimethylamino-isopropyl-thiophenyl-pyridylamine | 600 | Sulfuric acid mono-(N-cyclohexylamide) | 378 | | | do | 10 |
| 21 | {do / d,1-N-methylhexahydro-picolinic acid-2,6-dimethylanilide} | 150 / 150 | p-Toluene sulfonic acid | 215 | Polyvinylpyrrolidone | 500 | Difluorodichloromethane | |
| 22 | N-(3-dimethylaminopropyl)-thiophenyl-pyridylamine | 600 | d,1-Camphor sulfonic acid | 498 | | | Difluorodichloromethane plus tetrafluorodichloroethane 4060 | 10 |
| 23 | N-{3-[4-(2-hydroxy-ethyl)-piperazino]-propyl}-2-Cl-thiophenyl-pyridylamine | 600 | do | 372 | 1,2-propanediol | 450 | do | 10 |
| 24 | 2,4-dimethyl-6-sulfanilamido-pyrimidine | 180 | do | 162 | | | Monofluorotrichloromethane plus difluorodichloromethane 5050 | 10 |
| 25 | 2,6-bis-[di-(β-hydroxyethyl)-amino]-4,8-di-piperidino-pyrimido-(5,4-d)-pyrimidine | 1,200 | do | 1,188 | | | do | 10 |
| 26 | 7-{2-[2-hydroxy-2-(3,4-dihydroxyphenyl)-ethyl-amino]-ethyl}-theophylline | 91 | p-Toluene sulfonic acid | 46 | 1,2-propanediol | 400 | do | 4.5 |
| 27 | d,1-7-[2-(1-methyl-2-hydroxy-2-phenyl-ethyl-amino)-ethyl]-theophylline | 272 | d,1-Camphor sulfonic acid | 190 | | | Difluorodichloromethane plus tetrafluorodichloroethane 4060 | 10 |
| 28 | d,1-7-{3-[2-(3,4-dihydroxyphenyl)-2-hydroxy-ethylamino]-propyl}-theophylline | 30 | d,1-Camphor sulfonic acid | 20 | {1,2-propanediol / Ascorbylpalmitate} | 500 / 30 | Difluorodichloromethane plus tetrafluorodichloroethane 4060 | 10 |
| 29 | 7-[2-(1-methyl-2-phenyl-ethylamino)-ethyl]-theophylline | 67.8 | p-Toluene sulfonic acid | 37.8 | | | do | 10 |
| 30 | {d,1-7-{-3-[2-(3,4-dihydroxyphenyl)-2-hydroxy-ethylamino]-propyl}-theophylline / N-dimethylamino-isopropyl-4-azaphenothiazine} | 27 / 18 | d,1-Camphor sulfonic acid | 33.4 | {1,2-propanediol / Ascorbic acid} | 500 / 30 | do | 10 |
| 31 | d,1-7-{3-[2-(3,4-dihydroxyphenyl)-2-hydroxy-ethylamino]-propyl}-theophylline | 30 | Sulfuric acid mono-(N-cyclohexylamide) | 14.3 | {1,2-propanediol / Ascorbylpalmitate} | 500 / 30 | Monofluorotrichloromethane plus difluorodichloromethane 5050 | 10 |
| 32 | 7-[2-(1-methyl-2-phenyl-ethylamino)-ethyl]-theophylline | 67.8 | do | 35.6 | | | Difluorodichloromethane plus tetrafluorodichloroethane 4060 | 10 |
| 33 | 7-2-(1-Methyl-2-phenyl-ethylamino)-ethyl-theophylline | 67.8 | Sulfuric acid mono-morpholide | 33.2 | | | Monofluorotrichloromethane plus difluorodichloromethane 5050 | 10 |
| 34 | 1-pyrrolidino-4,4-diphenyl-butin-(2)-ol-(4) | 600 | p-Toluene sulfonic acid | 390 | | | Difluorodichloromethane plus tetrafluorodichloroethane | 10 |
| 35 | Aureomycin | 150 | d,1-Camphor sulfonic acid | 78 | | | Monofluorotrichloromethane plus difluorodichloromethane 5050 | 10 |

We claim:

1. A clear, stable solution under pressure adapted to be dispensed as an aerosol consisting essentially of (1) a pharmaceutical β-amino alcohol (2) as a solvent aid therefor a sulfonic acid selected from the group consisting of benzene sulfonic acid, toluene sulfonic acid, guaiazulene sulfonic acid, camphor sulfonic acid and sulfuric acid semiamides of the formula

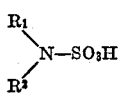

where R₁ and R₂ taken individually are hydrogen or cyclohexyl respectively and R₁ and R₂ taken together is a divalent radical forming a 5 to 6 membered heterocyclic group ring selected from the group consisting of pyrrolidine, piperidine, piperazine, homopiperazine and morpholine (3) ethyl alcohol and (4) a fluorochloro hydrocarbon propellant in an amount sufficient to enable the solution to be dispersed as an aerosol, said solution aid increasing the retention of the pharmaceutical substance in said ethyl alcohol and propellant combination.

2. A solution according to claim 1 wherein the β-aminoalcohol is either 1,3-methoxy-ω-(1-hydroxy-1-phenyl-isopropyl-amino)-propiophenone or 1-{N-(3-phenyl-3 - hydroxypropyl-(2))-aminoethyl}-naphthyl ketone.

3. A solution according to claim 1 wherein the propellant has 1 to 2 carbon atoms.

4. A solution according to claim 3 wherein the propellant is selected from the group consisting of difluorodichloromethane, tetrafluorodichloroethane and monofluorotrichloromethane.

5. A solution according to claim 1 wherein, in addition to ethyl alcohol, there is present in the solution a member of the group consisting of ethylene glycol, polyethyelne glycol, propylene glycol, benzyl alcohol and glycerine.

6. A solution according to claim 1 wherein the solution aid is selected from the group consisting of benzene sulfonic acid, p-toluene sulfonic acid, camphor sulfonic acid, guaiazulene sulfonic acid, sulfuric acid mono-(N-cyclohexylamide) and sulfuric acid monomorpholide.

7. A solution according to claim 1 wherein the pharmaceutical substance is present in an amount of 0.2 to 12% based on the weight of the fluorochlorohydrocarbon.

8. A clear, stable solution under pressure adapted to be dispensed as an aerosol consisting essentially of (1) a pharmaceutical theophylline derivative of the formula $$\text{T-Alk-NH}-\underset{R_3}{\underset{|}{CH}}-\underset{R_4}{\underset{|}{CH}}-R_5$$

wherein T is a dialkyl xanthine radical, Alk signifies an alkylene group of 2 to 4 carbon atoms, $R_3$ is hydrogen or a lower alkyl group, $R_4$ is hydrogen or a hydroxyl group, $R_5$ is phenyl or hydroxyphenyl, (2) as a solvent aid therefor a sulfonic acid selected from the group consisting of benzene sulfonic acid, toluene sulfonic acid, guaiazulene sulfonic acid, camphor sulfonic acid and sulfuric acid semiamides of the formula

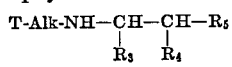

where $R_1$ and $R_2$ taken individually are hydrogen or cyclohexyl respectively and $R_1$ and $R_2$ taken together is a divalent radical forming a 5 to 6 membered heterocyclic group ring selected from the group consisting of pyrrolidine, piperidine, piperazine, homopiperazine and morpholine (3) ethyl alcohol and (4) a fluorochloro hydrocarbon propellant in an amount sufficient to enable the solution to be dispersed as an aerosol, said solution aid increasing the retention of the pharmaceutical substance in said ethyl alcohol and propellant combination.

9. A solution according to claim 8 wherein the propellant has 1 to 2 carbon atoms.

10. A solution according to claim 9 wherein the propellant is selected from the group consisting of difluorodichloromethane, tetrafluorodichloroethane and monofluorotrichloromethane.

11. A solution according to claim 8 wherein, in addition to ethyl alcohol, there is present in the solution a member of the group consisting of ethylene glycol, polyethylene glycol, propylene glycol, benzyl alcohol and glycerine.

12. A solution according to claim 8 wherein the solution aid is selected from the group consisting of benzene sulfonic acid, p-toluene sulfonic acid, camphor sulfonic acid, guaiazulene sulfonic acid, sulfuric acid mono-(N-cyclohexylamide) and sulfuric acid monomorpholide.

13. A solution according to claim 8 wherein the pharmaceutical substance is present in an amount of 0.2 to 12% based on the weight of the fluorochlorohydrocarbon.

14. A clear, stable solution under pressure adapted to be dispensed as an aerosol consisting essentially of (1) a pharmaceutical thiophenyl pyridylamine, (2) as a solvent aid therefor a sulfonic acid selected from the group consisting of benzene sulfonic acid, toluene sulfonic acid, guanazulene sulfonic acid, camphor sulfonic acid and sulfuric acid semiamides of the formula where $R_1$ and $R_2$ taken individually are hydrogen or cyclohexyl respectively and $R_1$ and $R_2$ taken together is a divalent radical forming a 5 to 6 membered heterocyclic group ring selected from the group consisting of pyrrolidine, piperidine, piperazine, homopiperazine and morpholine (3) ethyl alcohol and (4) a fluorochloro hydrocarbon propellant in an amount sufficient to enable the solution to be dispersed as an aerosol, said solution aid increasing the retention of the pharmaceutical substance in said ethyl alchol and propellant combination.

15. A solution according to claim 14 wherein the thiophenyl pyridylamine is N-(3-dimethylamino-propyl) thiophenyl-pyridylamine or N-{3-(4-2-hydroxy-ethyl)-piperazino)-propyl}-2-Cl-thiophenyl-pyridylamine.

16 A solution according to claim 14 wherein the propellant has 1 to 2 carbon atoms.

17. A solution according to claim 16 wherein the propellant is selected from the group consisting of difluorodichloromethane, tetrafluorodichloroethane and monofluorotrichloromethane.

18. A solution according to claim 14 wherein, in addition to ethyl alcohol, there is present in the solution a member of the group consisting of ethylene glycol, polyethylene glycol, propylene glycol, benzyl alcohol and glycerine.

19. A solution according to claim 14 wherein the solution aid is selected from the group consisting of benzene sulfonic acid, p-toluene sulfonic acid, camphor sulfonic acid, guaiazulene sulfonic acid, sulfuric acid mono-(N-cyclohexylamide) and sulfuric acid monomorpoholide.

20. A solution according to claim 14 wherein the pharmaceutical substance is present in an amount of 0.2 to 12% based on the weight of the fluorochlorohydrocarbon.

References Cited

UNITED STATES PATENTS

| | | | |
|---|---|---|---|
| 2,974,139 | 3/1961 | Schuler et al. | 424—246 |
| 3,379,650 | 4/1968 | Beasley, Jr. et al. | 252—308 |
| 2,774,711 | 12/1956 | Fleischhacker et al. | 424—315 |
| 3,079,299 | 2/1963 | Heilig | 424—181 |
| 3,141,821 | 7/1964 | Compeau | 424—315 |
| 3,144,386 | 8/1964 | Brightenback | 424—45 |
| 3,168,562 | 2/1965 | Walton et al. | 424—326 |
| 3,172,816 | 3/1965 | Swintosky | 424—181 |
| 3,174,905 | 3/1965 | Loo, Jr. et al. | 424—181 |
| 3,304,230 | 2/1967 | Abramson et al. | 424—45 |
| 3,322,624 | 3/1967 | Stone | 424—45 |
| 3,322,625 | 5/1967 | Shimmin | 424—45 |

OTHER REFERENCES

*Surfact Active Agents,* vol. I, Schwartz-Perry, Interscience Pubs., Inc., New York (1949), pp. 67, 117–121, 452 and 512.

*Chemical Abstracts,* vol. *51,* pp. 7331–7332, 16567–16568 (1957).

*Chemical Abstracts,* vol. *52,* p. 17128 (1958).

*Chemical Abstracts,* vol. *54,* p. 6178 (1960).

ALBERT T. MEYERS, Primary Examiner

F. E. WADDELL, Assistant Examiner